Feb. 21, 1961     J. A. HOWELLS     2,972,705
SIGNAL LEVEL INDICATOR
Filed Aug. 27, 1959
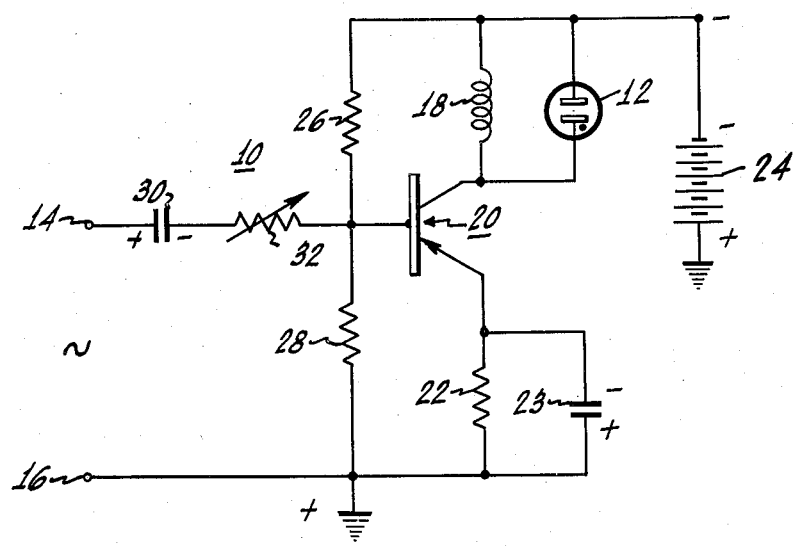
INVENTOR.
JOSEPH A. HOWELLS
BY Morris A. Parkin
ATTORNEY United States Patent Office 2,972,705
Patented Feb. 21, 1961

1

2,972,705
SIGNAL LEVEL INDICATOR

Joseph A. Howells, Riverton, N.J., assignor to Radio Corporation of America, a corporation of Delaware Filed Aug. 27, 1959, Ser. No. 836,352

7 Claims. (Cl. 315—135)

This invention relates generally to signal level indicators, and more particularly to a novel signal level indicator employing a gas lamp for indicating when the amplitude of a signal is greater than a selected amount. The signal level indicator of the present invention is especially useful in intelligence recording circuits where the normal operating voltages are relatively much lower than the ionization voltage of the gas in the gas lamp.

It has been proposed to use signal level indicators that employ a gas lamp, such as a neon lamp, in recording equipment where the operating voltages are greater than the voltage necessary to ionize the gas in the gas lamp. With the advent of transistorized recording circuits, however, the output voltages of the power supplies necessary to operate these circuits have been reduced to a point where the voltages normally available are relatively much lower than the ionization voltage of a noble gas, such as neon. The circuitry for operating a signal level indicator of the gas lamp type that was suitable in recording circuits employing vacuum tubes, for example, is not well suited for operating transistorized, relatively low voltage, recording circuits.

Accordingly, it is an object of the present invention to provide an improved signal level indicator that employs a gas lamp in a manner to render it operable in circuits wherein the normal operating voltages are relatively much lower than the ionization voltage of the gas in the gas lamp.

Another object of the present invention is to provide an improved signal level indicator employing a gas lamp that is especially suitable for operation in transistorized circuits.

Still another object of the present invention is to provide an improved signal level indicator that is relatively simple in construction and operation, easy to manufacture, and highly efficient in use.

In accordance with the present invention, the improved signal level indicator comprises a circuit wherein an inductor is connected in a shunt relationship with a gas lamp, such as a neon lamp. The inductor is also connected in series with the emitter-collector path of a transistor, and the transistor is biased to conduct current in the absence of any signals having amplitudes greater than those of a selected or desired amplitude applied to its base electrode. The transistorized circuit is energized by a voltage that is relatively lower than the ionization voltage of the gas in the gas lamp. Signals whose amplitude are to be monitored are applied to the input electrode of the transistor. Those signals which have a greater than selected amplitude cause the transistor to cease conducting. When this happens, current ceases to flow through the inductor, and the magnetic field about the inductor collapses suddenly. This change in magnetic field induces a relatively high voltage across the inductor so that the gas in the gas lamp is ionized, and the lamp lights. Thus, signals having amplitudes greater than a selected amplitude may be monitored by causing the gas lamp of the signal level indicator to light. The amplitude of a signal that causes the transistor to cease conducting may be controlled by means of a variable resistor connected in series with the input electrode of the transistor.

The novel features of the present invention, both as to its organization and method of operation, as well as additional objects and advantages thereof, will be understood more readily from the foregoing description when read in connection with the accompanying drawing the single figure of which shows a signal level indicator in accordance with the present invention.

Referring, now, more particularly to the drawing, there is shown a signal level indicator 10 wherein an indicator, such as a gas lamp 12, will indicate when signals having amplitudes greater than a predetermined amplitude are applied between a pair of input terminals 14 and 16 of the signal level indicator 10. An inductor 18 is connected in a shunt relationship with the lamp 12, and in series with the emitter-collector path of a P-N-P transistor 20, the inductor 18 being connected to the collector electrode of the transistor 20. A biasing resistor 22, by-passed by a capacitor 23, is connected between the emitter electrode of the transistor 20 and a common connection, such as ground. A source 24 of operating-voltage, such as a battery, for example, has its negative terminal connected to the inductor 18 and its positive terminal connected to the common connection (i.e., ground, in the illustrated example) in a manner to cause current to flow through the inductor 18 and the resistor 22 when the transistor 20 is in a conducting state.

Means are provided to cause the transistor 20 to conduct current both in the absence of any signals applied to its base and in the absence of signals having amplitudes greater than a predetermined amplitude applied to its base. To this end, a voltage divider comprising serially connected resistors 26 and 28 is connected across the source 24 of voltage. The junction of the resistors 26 and 28 is connected to the base electrode of the transistor 20. The voltage at the junction of the resistors 26 and 28 is such as to bias the transistor 20 into a conducting state in the absence of signals whose amplitudes exceed a selected amplitude. The input terminal 14 is connected to the base electrode of the transistor 20 through a series circuit comprising a coupling capacitor 30 and a current limiting impedance, such as a variable resistor 32. The input terminal 16 is connected to the common terminal, or ground.

The operation of a signal level indicator 10 will now be described. Let it be assumed that the signals to be monitored, such as audio signals in a magnetic tape recorder, have amplitudes below a selected amplitude. These signals are applied from the amplifier of the tape recorder (not shown) to the input terminals 14 and 16 of the signal level indicator 10. Current flows through the series circuit comprising the inductor 18, the transistor 20, and the resistor 22. Signals having amplitudes below the selected amplitude do not cause the base electrode to swing sufficiently positive to cut off conduction in the transistor 20, and, consequently, the gas lamp 12 does not light. Let it now be assumed that a signal of greater than the selected amplitude is applied to the input terminals 14 and 16. The forward conducting bias provided by the resistors 26 and 28 is now overcome, and the conduction of current through the transistor 20 ceases. The magnetic field that has been built up around the inductor 18, resulting from the current flow therethrough, now collapses. The voltage induced across the inductor 18 by this collapse of the magnetic field is sufficient in amplitude to ionize the gas in the gas lamp 12, and this action causes the lamp 12 to light. The resistor 32 is variable so that the amplitude of the signal that causes the transistor 20 to be cut off may be varied to any selected value.

From the foregoing description, it will be apparent that there has been described an improved signal level indicator employing, in transistorized circuits which operate at relatively low voltages, a gas lamp whose ionization voltage is relatively much greater than the highest voltage normally required in such transistorized circuits. In the embodiment shown and described, for example, the gas lamp may be a neon lamp, type NE–51, and the voltage source may be a 9 volt battery. The ionization voltage for the neon gas in the NE–51 lamp is in the neighborhood of 60 volts. Thus, the voltage of the gas lamp in the described embodiment is more than six times the voltage of the available voltage source.

Values of the several circuit components described above are given hereinbelow merely illustratively and are not to be construed in a limiting sense. Components having such values were used in a very satisfactory signal level indicator of the type shown and described. The resistances of the resistors 22, 26, and 28 were 680 ohms, 12,000 ohms, and 6,800 ohms, respectively. The inductance of the inductor 18 was 18 henries, and the capacity of each of the capacitors 23 and 30 was 10 microfarads. The resistance of the variable resistor 32 was in the neighborhood of 2,200 ohms, and the transistor 20 was of the 2N408 type. While the signal level indicator shown and described herein uses a PNP transistor, it will be understood that an NPN transistor may also be used by reversing the polarities indicated in the drawing.

What is claimed is:

1. Apparatus comprising a transistor having input, output, and common electrodes, an inductor, means to apply a source of voltage between said common and said output electrodes through said inductor, means to bias said input electrode to cause said transistor to normally conduct and thereby establish a magnetic field about said inductor, an indicator connected across said inductor and responsive to a predetermined change in said field, and means to apply external signals between said input electrode and said common electrode whereby signals having an amplitude greater than a selected amplitude will cut off conduction through said transistor to thereby effect said predetermined change in said magnetic field.

2. Apparatus comprising a transistor having input, output, and common electrodes, an inductor, means to apply a source of voltage between said input and said output electrodes through said inductor, means to bias said input electrode to cause said transistor to conduct in the absence of any signals of greater than a selected amplitude and thereby establish a magnetic field about said inductor, a gas lamp connected across said inductor and responsive to a predetermined change in said field, said voltage being relatively much lower than the ionizing voltage of the gas in said gas lamp, and means to apply external signals between said input electrode and said common electrode whereby signals having an amplitude greater than said selected amplitude will cause said transistor to cease conducting and thereby effect said predetermined change in said field whereby to establish a voltage across said gas lamp sufficient to ionize said gas.

3. A signal level indicator comprising a transistor having an emitter electrode, a collector electrode, and a base electrode, an inductor connected in a series circuit with the emitter-collector path of said transistor, means to connect a source of operating voltage in said series circuit, means to bias said transistor in a steady current conductive state in the absence of signals applied thereto, means to apply external signals to said base electrode, and a gas lamp connected across said inductor.

4. A signal level indicator comprising a transistor having an emitter electrode, a collector electrode, and a base electrode, an inductor connected in a series circuit with the emitter-collector path of said electrode transistor, means to connect a source of operating voltage in said series circuit, means to connect said base electrode to said source of voltage to bias said transistor in a steady current conducting state in the absence of signals applied thereto, means to apply external signals to said base electrode, and a gas lamp connected across said inductor, said operating voltage being relatively much lower than the ionizing voltage of the gas in said gas lamp.

5. Apparatus for indicating when the amplitude of signals is greater than a selected amplitude comprising a transistor, an inductor connected in a series circuit with said transistor whereby current will flow through said inductor when an operating voltage is applied to said series circuit to thereby establish a magnetic field about said inductor, means connected to said transistor to apply said signal thereto and to cut off conduction therethrough when said signals have an amplitude greater than said selected amplitude to thereby effect collapse of said field and thus induce a new voltage across said inductor, and a gas lamp connected across said inductor, said gas lamp being normally extinguished but being lighted by said induced voltage across said inductor when current ceases to flow therethrough.

6. Apparatus for indicating when the amplitude of signals is greater than a selected amplitude comprising a transistor, an inductor connected in a series circuit with said transistor whereby current will flow through said inductor when an operating voltage is applied to said series circuit to thereby establish a magnetic field about said inductor, means connected to said transistor to apply said signal thereto and to cut off conduction therethrough when said signals have an amplitude greater than said selected amplitude to thereby effect collapse of said field and thus induce a new voltage across said inductor, and a gas lamp connected across said inductor, said operating voltage being relatively much lower than the ionizing voltage of the gas in said lamp, and said induced voltage across said inductor being of sufficient magnitude to effect ionization of said gas.

7. A signal level indicator comprising a transistor having emitter, collector, and base electrodes, a resistor connected to said emitter electrode, an inductor connected to said collector electrode, means to apply an operating voltage to said transistor through said resistor and said inductor, means connecting said base electrode to said operating voltage to bias said transistor in a state of steady conduction in the absence of signals applied thereto, a gas lamp connected across said inductor, a capacitor and a second resistor connected in series with each other, and means to apply external signals to said base electrode through said capacitor and said last-mentioned resistor whereby to cause said transistor to cease conducting current when the amplitude of said signals is of greater than a selected value, the voltage induced across said inductor when current ceases to flow therethrough being of sufficient amplitude to fire said gas lamp.

References Cited in the file of this patent

UNITED STATES PATENTS

| 2,882,463 | Dickinson | Apr. 14, 1959 |
| 2,887,592 | Stout et al. | May 19, 1959 |
| 2,896,124 | Brown | July 21, 1959 |
| 2,898,478 | Haugen | Aug. 4, 1959 |

OTHER REFERENCES

"Transistor Operated Neon Indicator," IBM Technical Disclosure Bulletin; April 1959.